(12) United States Patent
Chan et al.

(10) Patent No.: US 8,774,813 B2
(45) Date of Patent: Jul. 8, 2014

(54) INTERFERENCE MANAGEMENT (71) Applicant: Verizon Patent and Licensing Inc., Basking Ridge, NJ (US)

(72) Inventors: Yee Sin Chan, San Jose, CA (US); Jin Yang, Orinda, CA (US); Matthew W. Nelson, Pleasanton, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 52 days.

(21) Appl. No.: 13/670,989

(22) Filed: Nov. 7, 2012

(65) Prior Publication Data
US 2013/0065599 A1 Mar. 14, 2013

Related U.S. Application Data (63) Continuation-in-part of application No. 13/207,909, filed on Aug. 11, 2011, now Pat. No. 8,437,765.

(51) Int. Cl.
*H04W 40/00* (2009.01)
(52) U.S. Cl.
USPC ............ 455/445; 455/436; 455/447; 455/449
(58) Field of Classification Search
USPC .......... 455/446, 445, 447, 449, 436, 442, 440
See application file for complete search history.

(56) References Cited

U.S. PATENT DOCUMENTS

| | | | |
|---|---|---|---|
| 8,594,672 B2 * | 11/2013 | Agrawal et al. | 455/436 |
| 2003/0017829 A1 | 1/2003 | Ching-Hsiang et al. | |
| 2004/0202135 A1 | 10/2004 | Han et al. | |
| 2004/0259565 A1 | 12/2004 | Lucidarme | |
| 2010/0008313 A1 | 1/2010 | McHenry et al. | |
| 2011/0009105 A1 | 1/2011 | Lee et al. | |
| 2012/0052793 A1 | 3/2012 | Brisebois et al. | |
| 2012/0282864 A1 * | 11/2012 | Dimou et al. | 455/67.14 |
| 2013/0107798 A1 * | 5/2013 | Gao et al. | 370/328 |

* cited by examiner

*Primary Examiner* — Khalid Shaheed (57) ABSTRACT

In a network containing a macro base station and wireless access points within the range of the macro base station, information from wireless access points are used to change the quantity of almost blank subframes delivered by the macro base station, adjust the cell range extension area of one or more of the wireless access points, or provide instructions to alter the number of wireless access points. The information is analyzed. The analysis allows determination of a capacity gain associated with using the wireless access points within an area associated with the macro base station and whether the capacity gain provides at least a threshold amount of gain permitting the macro base station and the wireless access points to provide service to mobile devices within the area.

24 Claims, 8 Drawing Sheets

INTERFERENCE MANAGEMENT

RELATED APPLICATION

This application is a continuation-in-part of U.S. patent application Ser. No. 13/207,909, filed on Aug. 11, 2011. The entire content of U.S. patent application Ser. No. 13/207,909 is incorporated herein by reference.

BACKGROUND

A cellular phone carrier may use a macro base station to handle traffic and signaling between mobile devices and a core of a cellular phone network. To accommodate additional traffic, a cellular phone carrier may use one or more small cells (e.g., a micro cell), in addition to the macro base station, to increase the capacity of the cellular phone network to accommodate the additional traffic.

DETAILED DESCRIPTION OF PREFERRED EMBODIMENTS

The following detailed description refers to the accompanying drawings. The same reference numbers in different drawings may identify the same or similar elements.

Systems and/or methods, described herein, may allow a carrier (e.g., a mobile network operator, a wireless service provider, a cellular company, etc.) to deploy one or more small cells (e.g., a micro cell, a pico cell, a femto cell, or the like) in a cellular network by optimizing an almost blank subframe ratio and/or a cell range extension value so that there is minimal interference between the small cells and a macro base station without reducing the capacity of the macro base station. For example, a macro base station may provide service to one or more user devices (e.g., a smart phone) in a particular area within the network. Within the particular area of the network, wireless access points may be deployed to segments within the area because these segments may not be receiving enough capacity from the macro base station. The wireless access points may also enhance the ability of the network to provide service to additional user devices by increasing the coverage area of the network by using, for example, cell range extension or by providing additional capacity to serve user devices locally. The cell range extension is the ability of the wireless access point to increase its dB value which may result in serving additional user devices in the segment. The wireless access point may create or increase an existing cell range extension area by increasing the decibel (dB) range of the wireless access point. However, because the wireless access point and the macro base station may use the same frequency, this may result in interference between the small cells and the macro base station in the cell range extension area. To minimize the interference, the base station may use almost blank subframes to reduce the amount of interference.

Almost blank subframes are frames that are transmitted by the macro base station to a user device when the user device is located in the cell range extension area. Almost blank subframes are frames that are transmitted by the macro base station to user devices served by the macro base station, including those in cell range extension areas. The frames are mute except for a minimal amount of information (e.g., control information such as common reference symbols) that are transmitted to prevent radio link failure. Since the macro base station is not transmitting any information in the almost blank subframes, an interval of time associated with an almost blank subframe transmission will allow the small cell to transmit to the user device in the cell range extension area without interference from the macro base station. Too many almost blank subframes and/or an excessive cell range extension area may reduce the capacity of the macro base station to provide service to user devices that are not being served by the wireless access points associated with the small cells in the coverage area. Thus, the amount of interference between the macro base station and the small cells may be minimized by adjusting the amount of almost blank subframes, the cell range extension area, and/or the number of small cells without reducing the ability of the macro base station to serve the coverage area.

The amount of almost blank subframes may be selected to maximize the number of user devices serviced over the area based on the coverage provided in the small cell areas and coverage outside the small cell areas. The amount of almost blank subframes may be limited to a predetermined maximum that is less than that desired by wireless access points in one or more of the small cell areas. If the quantity of almost blank subframes is less than the requirements of a particular wireless access point to provide the desired capacity (i.e., service to all of the user devices associated with the wireless access point), the wireless access point may instruct one or more user devices to use the macro base station rather than the wireless access point if the wireless access point has exceeded a utilization threshold level set by an operator of a network.

Figure 1:
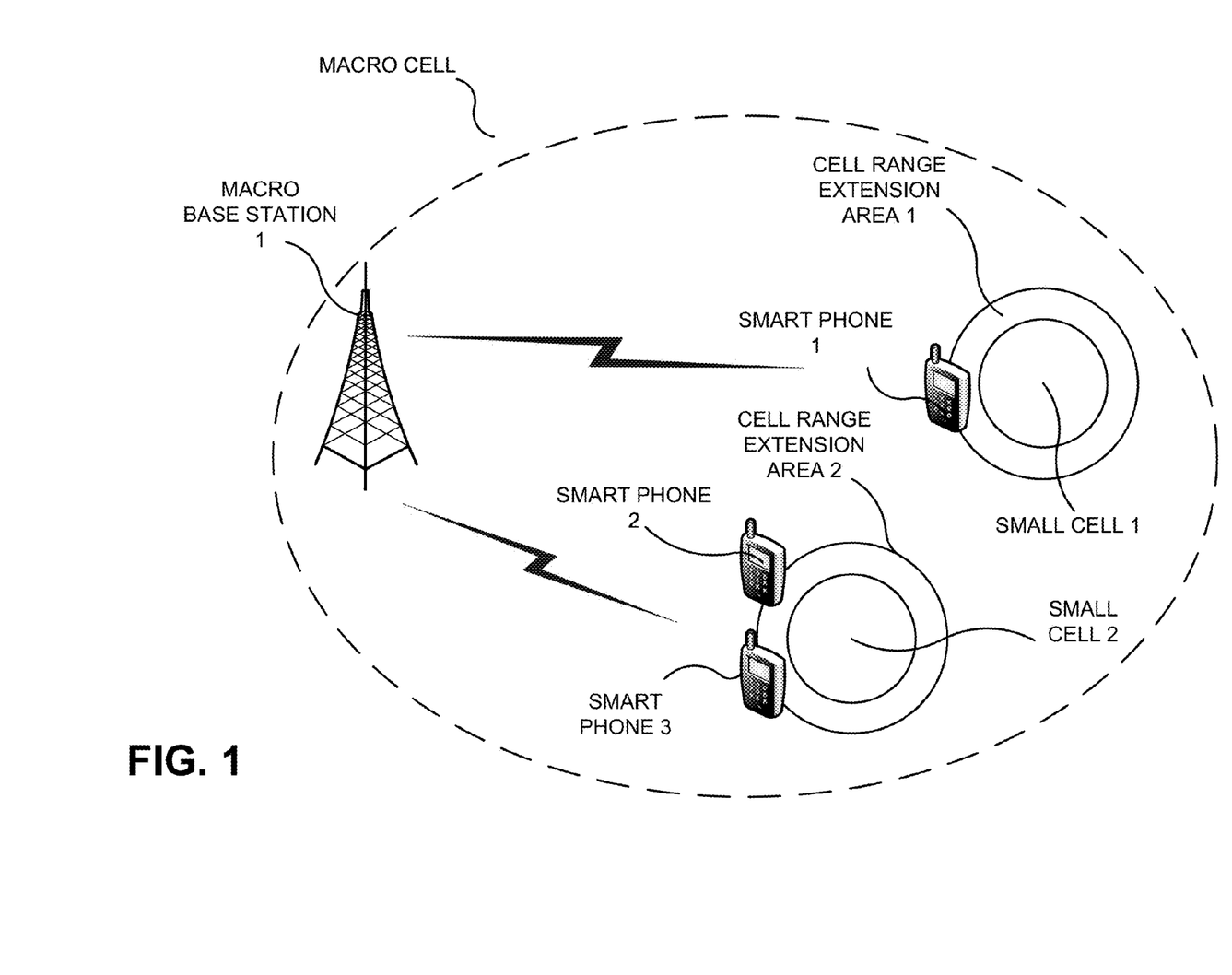
FIG. 1 is a diagram of an overview of an implementation described herein.

FIG. 1 is a diagram of an overview of an implementation described herein. FIG. 1 shows a smart phone 1, a smart phone 2, a smart phone 3, a macro base station 1, a small cell 1, a small cell 2, a cell range extension area 1, and a cell range extension area 2. In practice, there may be additional smart phones, macro base stations, small cells, and/or cell range extension areas. Assume that macro base station 1 provides services to user devices (e.g., a smart phone) in the macro cell and that macro base station 1 may also communicate with small cells 1 and 2. Further assume that the small cells 1 and 2 provide service to user devices in each respective small cell and the cell range extension area. As shown in FIG. 1, smart phone 1 is located in cell range extension area 1. Also, as shown in FIG. 1, smart phone 2 and smart phone 3 are located in cell range extension area 2.

Macro base station 1 may receive information from a wireless access point associated with small cell 1 and a wireless access point associated with small cell 2. Assume, for this example, that the wireless access point (in small cell 1) corresponds to small cell 1 and that the wireless access point (in small cell 2) corresponds to small cell 2. The information may include the size of the cell range extension area (e.g., the dB output from the small cell), the number of user devices located within each small cell, and/or other information. Assume that macro base station 1 determines (using the information) that, based on the number of small cells, the size of cell range extension area 1 may be increased. By increasing the size of cell range extension area 1, the wireless access point in small cell 1 may provide additional service to a greater coverage area. Macro base station 1 may notify small cell 1 to increase the cell range extension area. Small cell 1 may receive the information from macro base station 1 and may increase the area of cell range extension area 1. Further, macro base station 1 may determine that the amount of almost blank subframes being transmitted to the smart phones in both cell range extension areas can be changed based on one or more factors described below and/or a mathematical formula as described below. Macro base station 1 may determine that these changes will not decrease the ability of the macro base station to provide service to user devices in the rest of the coverage area. In some implementations, macro base station 1 may send the information to another device (such as a network management device) and that device may determine desired changes in the amount of almost blank subframes and the cell range extension area.

As a result, the carrier may use almost blank subframes and cell range extension area techniques to enhance the capabilities of small cells within a particular area (or a portion of the particular area) without reducing the ability of the macro base station (associated with the particular area) to provide service. Further, the carrier may be able to segment the particular area so that the macro base station may serve each segment separately. This may allow the carrier to optimize network performance with greater accuracy rather than using an ad-hoc approach to using small cells in conjunction with macro base stations.

Figure 2:
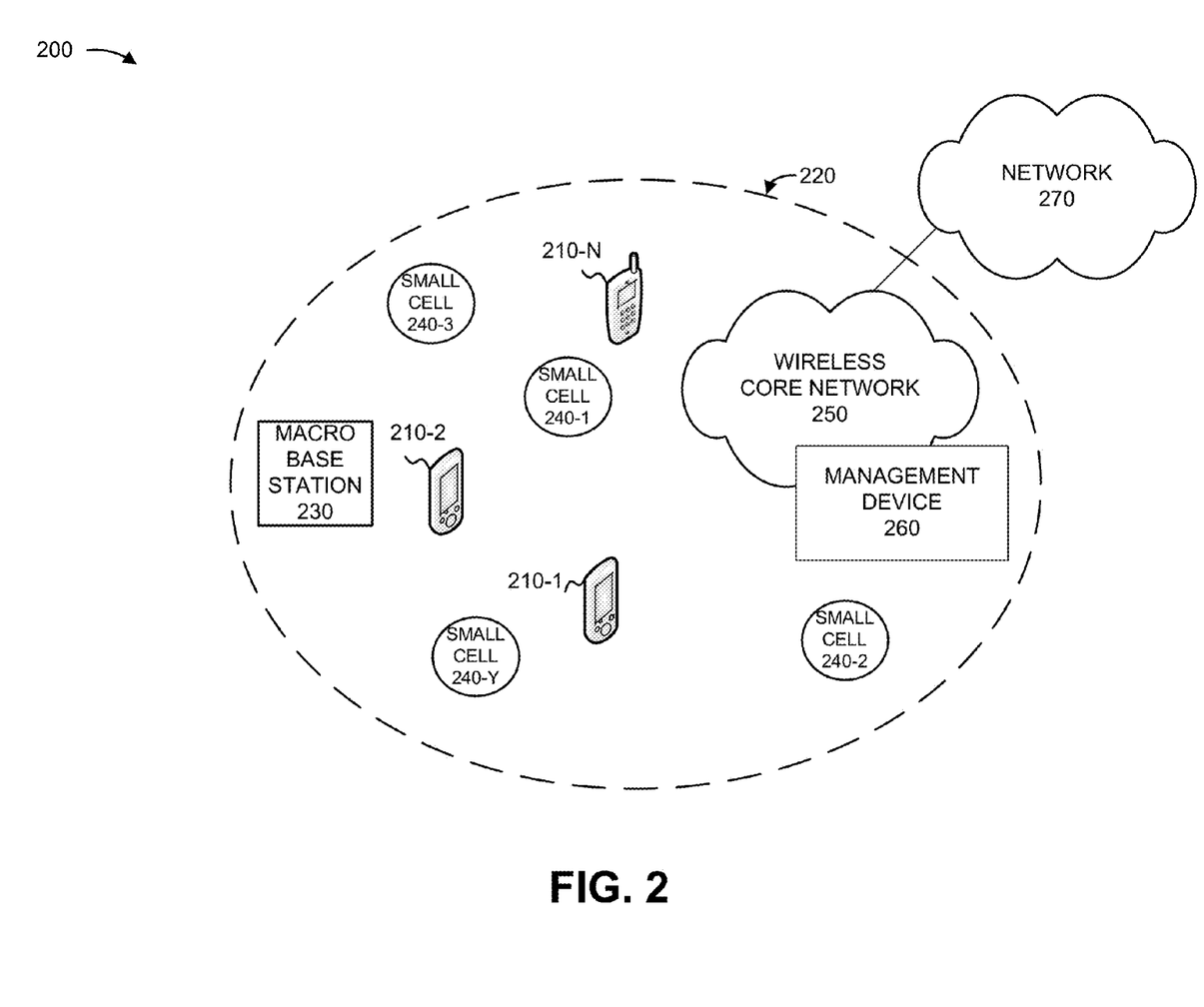
FIG. 2 is a diagram of an example environment in which systems and/or methods described herein may be implemented.

FIG. 2 is a diagram of an example environment 200 in which systems and/or methods described herein may be implemented. Environment 200 may include multiple mobile devices 210-1, 210-2, . . . , 210-N (referred to generally as "mobile devices 210" or individually as "mobile device 210"), a carrier network 220, including a macro base station 230, multiple small cells 240-1, 240-2, . . . , 240-Y (referred to generally as "small cells 240" or individually as "small cell 240"), a wireless core network 250, a management device 260, and a network 270.

Mobile device 210 may include any device capable of transmitting and receiving data (e.g., voice, text, images, and/or multimedia data) over carrier network 220. For example, mobile device 210 may be a self-contained data device, such as a mobile telephone, a smart phone, an electronic notepad, a personal digital assistant (PDA), a tablet computer, and/or a laptop. Mobile devices 210 may use identical protocols to establish wireless communication sessions with a macro base station 230 and/or small cells 240. The wireless communication sessions may be used for voice (e.g., telephone calls) or data sessions.

Carrier network 220 may include any cellular network (e.g., a mobile phone network) that provides cellular phone service to users (e.g., subscribers) of a particular carrier. Carrier network 220 may provide the cellular phone service within a particular geographical area (e.g., the United States of America (USA)). Carrier network 220 may include a heterogeneous network that includes base stations of different types, including a macro base station 230 and different types of small cells 240, as described further below.

Macro base station 230 may include one or more network devices that receive, process, and/or transmit traffic, such as audio, video, text, and/or other data, destined for and/or received from user device 205. Macro base station 230 may send traffic to and/or receive traffic from user device 205 via an air interface. In some example implementations, macro base station 230 may be an eNodeB ("eNB") device and may be part of a long term evolution (LTE) network. One or more base stations 210 may be associated with a RAN, such as the LTE network. Macro base station 230 may provide service to a macro cell. Different macro cells may receive different quantities of almost blank subframes from different macro base stations 230. Within a geographic area (with multiple macro cells), each macro cell may receive almost blank subframe transmissions from a macro base station 230 associated with each macro cell at the same time (e.g., the transmissions are synchronized).

Small cell 240 may refer to a micro cell, a pico cell, a femtocell, and/or one or more other coverage areas that have an access point device (e.g., a wireless access point device) that may act as a base station for a limited set of mobile devices 210 and/or for a limited geographic area (i.e., the limited set of mobile devices 210 and/or the limited geographic area are smaller than a set of mobile devices 210 and a size of a geographic area, respectively, served by macro base station 230). In some implementations, small cell 240 may establish a wireless communication session with mobile device 210 by using the same protocols as the macro base station 230. In some implementations, small cell 240 may include a nomadic device that may be relocated from one geographic location to another geographic location. In some implementation, one or more small cells 240 may be added to a geographic location served by macro base station 230. Small cell 240 may also refer to a wireless access point device, or another device associated with small cell 240, that may communicate with other devices (e.g., user device 210, macro base station 230, management device 260, etc.).

Mobile device 210 may connect to macro base station 230 or small cell 240. In a typical implementation, mobile device 210 may connect to small cell 240 when mobile device 210 is within range of small cell 240. When mobile device 210 moves out of range of small cell 240, mobile device 210 may switch (e.g., handoff) the connection to macro base station 230. The switch may occur without interrupting the communication session of mobile device 210.

Wireless core network 250 may include components (not shown) to implement a core network of the Evolution-Data Optimized (EVDO) standard. One implementation of such a core network includes the Evolved Packet Core (EPC) architecture. In other implementations, other network technologies, such as fourth-generation wireless telephone technology ("4G"), third generation network technology ("3G"), or second-generation wireless telephone technology ("2G"), may be implemented instead of or in addition to EVDO. Components within wireless core network 250 may generally be connected via wired or wireless IP-based connections.

Management device 260 may include one or more server devices, of a network operations management system, that may collect network statistics from and/or about mobile devices 210, macro base station 230, and/or small cells 240. The network statistics may include information about traffic statistics and/or other information associated with macro base station 230 and/or small cells 240. Management device 260 may analyze the network statistics to determine where traffic is concentrated and, therefore, where additional, or fewer, small cells 240 could be placed to facilitate network communications. Management device 260 may send a communication containing adjustment of the small cells 240 to one or more individuals (e.g., a technician) who may be involved in physically adding a small cell 240 (e.g., adding a new wireless access point) or physically removing a small cell 240.

Network 270 may include one or more wired and/or wireless networks. For example, network 270 may include another cellular network, a public land mobile network (PLMN), a second generation (2G) network, a third generation (3G) network, a fourth generation (4G) network, a fifth generation (5G) network, and/or one or more other networks. Additionally, or alternatively, network 270 may include a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks. In one implementation, network 270 may include carrier network 220 and/or wireless core network 250.

The quantity of devices and/or networks illustrated in FIG. 2 is provided for explanatory purposes only. In practice, there may be additional devices and/or networks; fewer devices and/or networks; different devices and/or networks; and differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
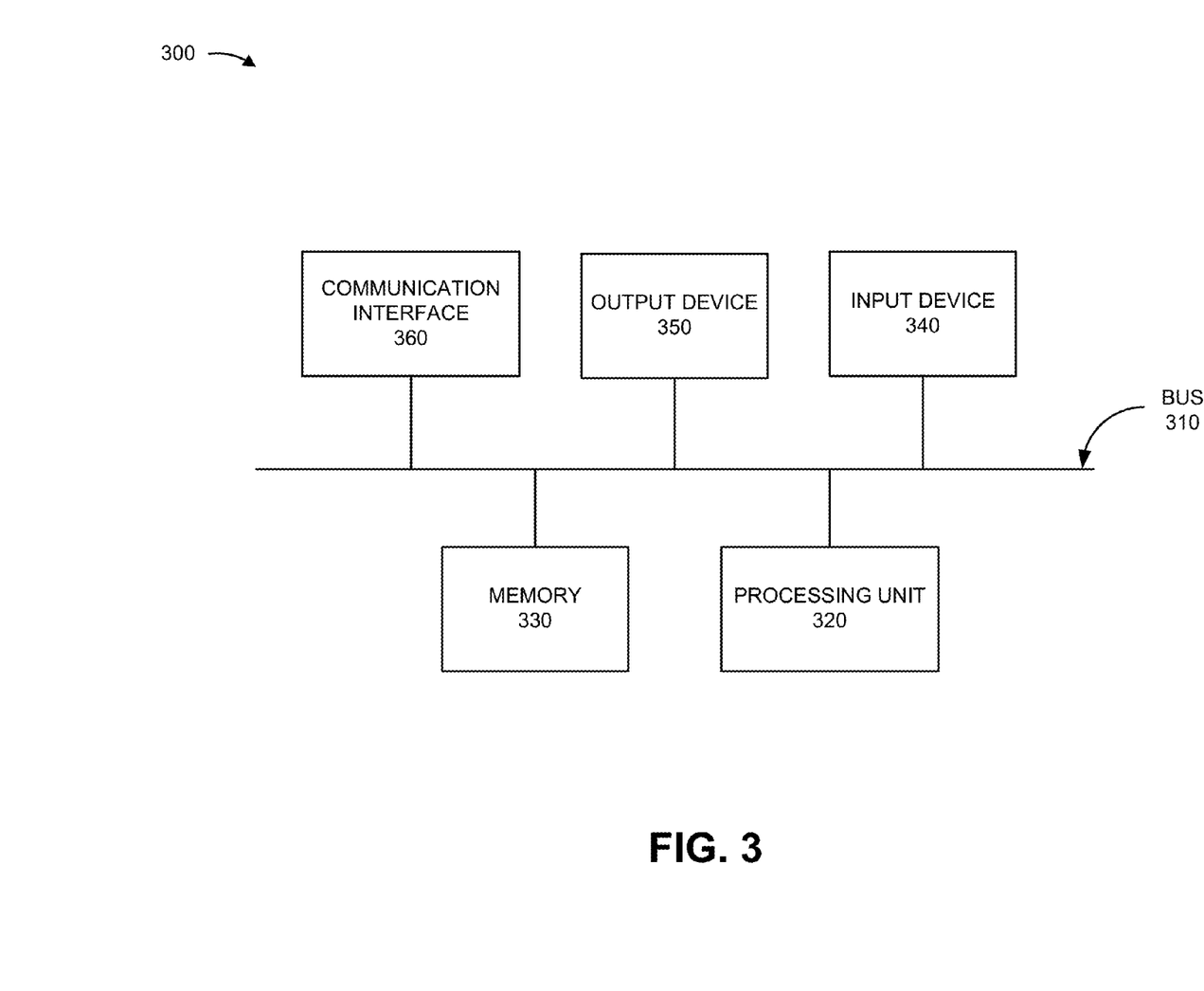
FIG. 3 is a diagram of example components of one or more devices of FIG. 2.

FIG. 3 is a diagram of example components of a device 300. Device 300 may correspond to management device 260 and/or mobile device 210. Each of mobile device 210 or management device 260 may include one or more devices 300 and/or one more components of device 300.

As shown, device 300 may include a bus 310, a processing unit 320, a memory 330, an input device 340, an output device 350, and a communication interface 360.

Bus 310 may include one or more connections that permit communication among the components of device 300. Processing unit 320 may include one or more processors or microprocessors that interpret and execute instructions. In other implementations, processing unit 320 may be implemented as or include one or more application specific integrated circuits (ASICs), field programmable gate arrays (FPGAs), or the like.

Memory 330 may include a random access memory (RAM) or another type of dynamic storage device that stores information and instructions for execution by processing unit 320, a read only memory (ROM) or another type of static storage device that stores static information and instructions for the processing unit 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, a button, one or more biometric components, or the like. Output device 350 may include a device that outputs information to the operator, such as a display, a speaker, a light emitting diode, etc.

Communication interface 360 may include any transceiver-like mechanism that enables device 300 to communicate with other devices and/or systems. For example, communication interface 360 may include wired and/or wireless components for communicating with other devices, such as other devices of environment 200.

As described below, device 300 may perform certain operations. Device 300 may perform these operations in response to processing unit 320 executing software instructions contained in a computer-readable medium, such as memory 330. A computer-readable medium may be defined as a non-transitory memory device. A memory device may include space within a single physical storage device or spread across multiple physical storage devices. The software instructions may be read into memory 330 from another computer-readable medium or from another device via communication interface 360. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

While FIG. 3 shows device 300 as having a particular quantity and arrangement of components, in other implementations, device 300 may include fewer components, different components, differently arranged components, or additional components than depicted in FIG. 3. Alternatively, or additionally, one or more components of device 300 may perform one or more other tasks described as being performed by one or more other components of device 300.

Figure 4:
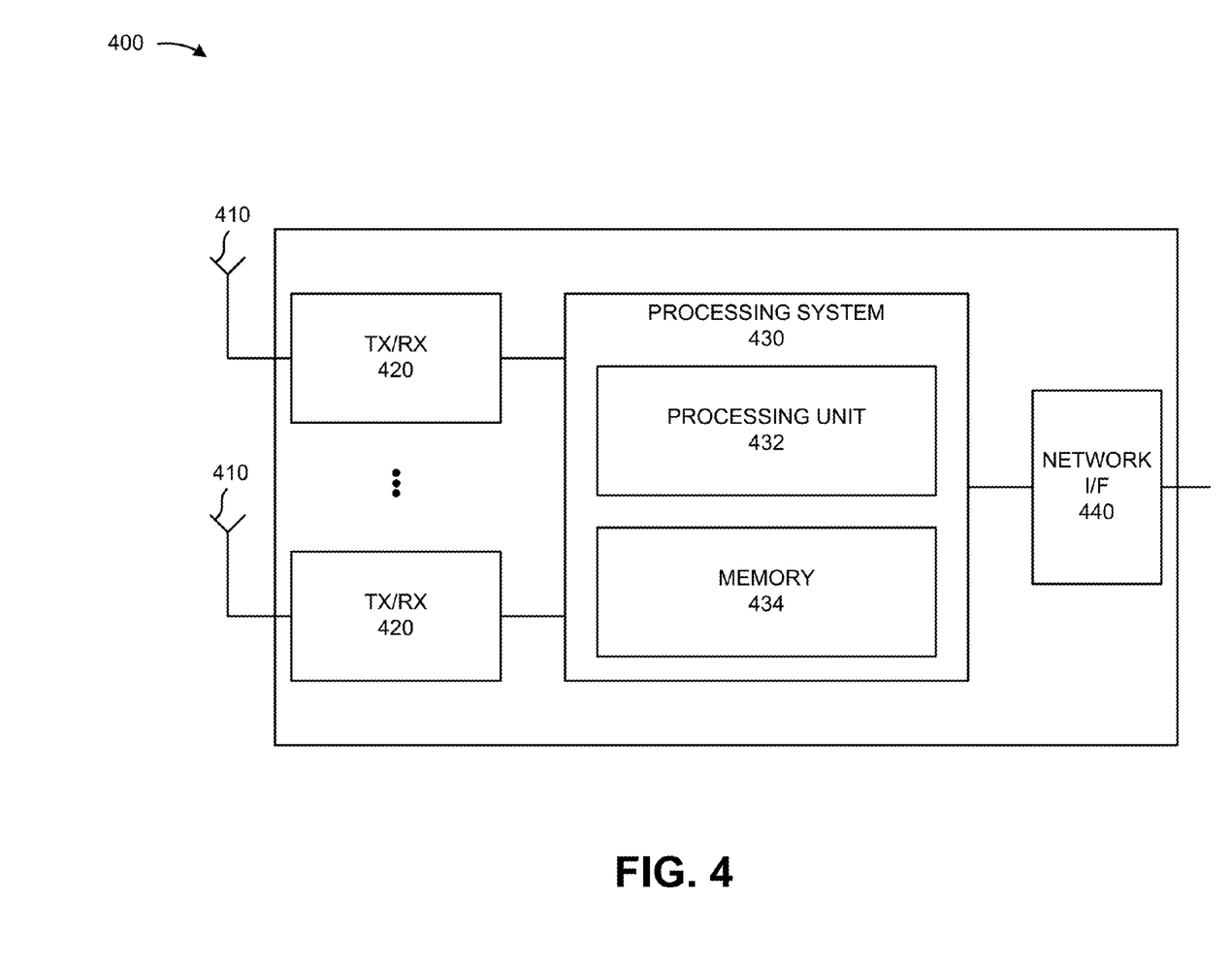
FIG. 4 is a diagram of example components of a base station of the network depicted in FIG. 2.

FIG. 4 is a diagram of example components of device 400 that may correspond to macro base station 230 and/or an access point of small cell 240. Alternatively, or additionally, macro base station 230 and/or small cell 240 may include one or more devices 400 and/or one or more components of device 400.

As shown in FIG. 4, device 400 may include antennas 410, transceivers (TX/RX) 420, a processing system 430, and a network interface (I/F) 440. Antennas 410 may include one or more directional and/or omni-directional antennas. Transceivers 420 may be associated with antennas 410 and may include transceiver circuitry for transmitting and/or receiving symbol sequences in a network, such as network 220, via antennas 410.

Processing system 430 may control the operation of device 400. Processing system 430 may also process information received via transceivers 420 and network interface 440. Processing system 430 may further measure quality and strength of a connection, may determine a frame error rate (FER), and may transmit this information to network 270. As illustrated, processing system 430 may include a processing unit 432 and a memory 434.

Processing unit 432 may include one or more processors, microprocessors, application specific integrated circuits (ASICs), field programmable gate arrays (FPGAs), or the like. Processing unit 432 may process information received via transceivers 420 and network interface 440. The processing may include, for example, data conversion, forward error correction (FEC), rate adaptation, Wideband Code Division Multiple Access (WCDMA) spreading/dispreading, quadrature phase shift keying (QPSK) modulation, etc. In addition, processing unit 432 may transmit control messages and/or data messages, and may cause those control messages and/or data messages to be transmitted via transceivers 420 and/or network interface 440. Processing unit 432 may also process control messages and/or data messages received from transceivers 420 and/or network interface 440.

Memory 434 may include a random access memory (RAM), a read-only memory (ROM), and/or another type of memory to store data and instructions that may be used by processing unit 432.

Network interface 440 may include one or more input/output devices that allow device 400 to transmit data to and receive data from another device, such as a radio network controller.

As described herein, device 400 may perform certain operations in response to processing unit 432 executing software instructions contained in a computer-readable medium, such as memory 434. The software instructions may be read into memory 434 from another computer-readable medium or from another device via antennas 410 and transceivers 420. The software instructions contained in memory 434 may cause processing unit 432 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows example components of device 400, in other implementations, device 400 may contain fewer components, different components, differently arranged components, or additional components than depicted in FIG. 4. Alternatively, or additionally, one or more components of device 400 may perform one or more other tasks described as being performed by one or more other components of device 400.

Figure 5:
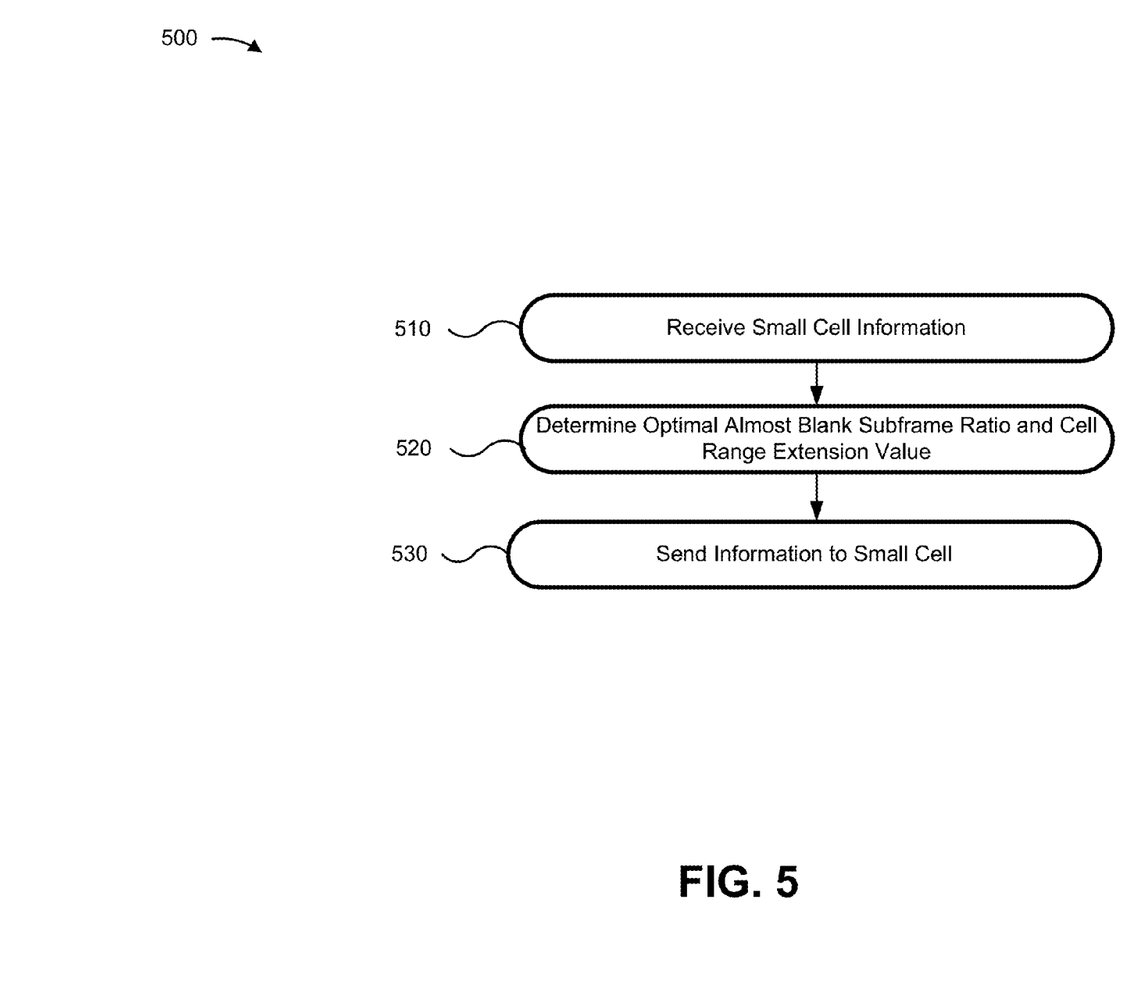
FIG. 5 is a flowchart of an example process for determining an optimal almost blank subframe ratio and/or cell range extension value.

FIG. 5 is a flow chart illustrating an example process 500 for determining an optimal almost blank frame ratio and/or a cell range extension value. Process 500 may be performed, for example, by macro base station 230. In other implementations, some or all of process 500 may be performed by another device or group of devices, such as management device 260.

Process 500 may include receiving small cell information (block 510). For example macro base station 230 may receive information for small cell 240. Macro base station 230 may receive information from small cell 240 that small cell 240 is located in a particular location in the macro cell. Small cell 240 may store information (when small cell 240, for example, is installed) about the location and/or the geographic size of the location. For example, a small cell 240 may store information that small cell 240 is associated with a coffee shop and a geographic size of 1,500 square feet. Small cell 240 (e.g., a wireless access point) may use the geographic size and the type of area being served by small cell 240 to determine a cell range extension value (e.g., current output of 5 dB and 10,000 square feet may require a cell range extension value of 4 dB in addition to the current output of 5 dB).

Additionally, or alternatively, macro base station 230 (or network database device associated with macro base station 230) may receive the information associated with the type of location and the geographic size of the area from small cell 240 and use this information to determine cell range extension values to cover the boundary of the area. Macro base station 230 may determine, based on the stored information, that a particular size of a geographic location and the type of location associated with small cell 240 may result in a particular cell range extension value. For example, a coffee house may have a smaller area and thus a smaller cell range extension value (e.g., macro base station 230 may determine that a coffee house that is 5,000 square feet requires a cell range extension value of 4 dB based on the size of the coffee house) than a shopping mall area that may require a larger cell range extension value (e.g., macro base station 230 may determine that a shopping mall that is 500,000 square feet and requires a cell range extension value of 15 dB based on the size of the shopping mall).

Small cell 240 may also store additional information associated with the type of area being served within small cell 240. For example, small cell 240 may store information that small cell 240 is being used in a coffee house and that the coffee house is open at particular hours of the day, and/or the number of users historically present during various time periods, information that is provided by the user (e.g., through a user device local to small cell 240). This information may be used by small cell 240 to calculate cell range extension values (e.g., a cell range extension value of 5 dB is needed from 12:00 p.m. to 2:00 p.m. at a coffee house due to the increased number of user devices).

Additionally, or alternatively, macro base station 230 may receive some or all of the above information from the user. Macro base station 230 (and/or a network database device associated with macro base station 230) may use this information to determine cell range extension values. Thus, for example, cell range extension values may result in a cell range extension value of 10 dB that is needed from 4:00 p.m. to 9:00 p.m. on weekdays and 11:00 a.m. to 6:00 p.m., on weekends for a shopping mall associated with a small cell 240.

Macro base station 230 may receive information that includes radio frequency characteristics associated with small cells 240. For example, macro base station 230 may receive information about backhaul services, such as Ethernet, fiber, or other types of services that are associated one or more small cells 240. Macro base station 230 may use the information to determine whether an existing cell range extension area for small cell 240 should be increased or decreased, or whether a new cell range extension area for small cell 240 should be created.

Additionally, macro base station 230 may receive information from small cell 240 regarding the number of mobile devices 210 receiving service from small cell 240. Additionally, macro base station 230 may receive information, from small cell 240, regarding the total current data usage associated with small cell 240. Additionally, macro base station 230 may receive information, from small cell 240, regarding the amount of dB (e.g., being transmitted by a wireless access point in small cell 240) for a cell range extension area associated with small cell 240.

Process 500 may include determining an optimal almost blank subframe ratio and cell range extension value (block 520). For example, macro base station 240 may determine the optimal almost blank subframe ratio and cell range extension area that provides sufficient capacity gain within the particular coverage area. The capacity gain may be the amount of gain required for the small cells 240 and the macro base station 230 to provide service to all (or all expected) user devices 210 within the macro cell area. In some example implementations, macro base station 230 may use the following formula to determine the capacity gain:

$$C\{e_j,r\}=\max_{\{r,ej\}}\{\Sigma_{j=0}^{(n-1)}u_j(e_j)\cdot D_j+(1-r)\cdot C_m\}.$$

In the example formula, "$e_j$" may refer to a cell range extension area value with values starting from 1 dB. In the example formula, "r" may refer to a percentage of almost blank subframes to be transmitted by macro base station 230. In some implementations, the range of values of "r" may be from 0 to 1. In the example formula, "$C_m$" may refer to a capacity of macro cell 220. In the example formula, "$D_j$" may refer to the average data (or information) usage per mobile device 210 (e.g., 0.1 megabytes per mobile device 210) in a small cell 240. In the example formula "$u_j$" may refer to the number of mobile devices 210 within a small cell 240. In the example formula, the summation range may be from j to (n−1), with "n" referring to the number of small cells 240 within macro cell 220. In the example formula, $C\{e_j, r\}$ may refer to the maximum capacity gain based on the almost blank subframe and cell range extension value. While the above-formula has the above defined variables, the formula may have fewer of the above-defined variables, and/or different variables.

For example, for a first small cell 240 associated with j=1, assume that there are 12 mobile devices 210 (the "$u_j$" variable) with an average data usage per mobile device 210 within this particular small cell 240. Macro base station 230 may determine the average data usage by using the number of mobile devices 210 and the total data usage associated with small cell 240. Macro base station 230 may receive information from the first small cell 240 that the cell range extension value is 9 dB. Macro base station 230 may have information that the almost blank subframe variable "r" is 0.25 for macro cell 220 (25% of frames transmitted by macro base station 230 are almost blank subframes) based on previous transmissions in macro cell 220 or based on a calculated value (e.g., an average value based on historical information such as transmissions in the last 10 days, 20 days, stored by macro base station 230). In the same example, for a second small cell 240 (associated with j=2), assume that there are 6 mobile devices 210 (the "$u_j$" variable). Macro base station 230 may receive information from the second small cell 240 that the cell range extension value is 5 dB.

Using the above variables, the example formula may provide a value associated with a maximum capacity gain that is associated with the almost blank subframe and cell range extension values. Macro base station 230 may compare the maximum capacity gain from the example formula with a threshold value of gain (stored by macro base station 230) needed to provide service to the total number of mobile devices 210 in macro cell 220. For example, if macro cell 220 has 20 mobile devices 210, then macro base station 230 may determine that, for example, a 5 dB threshold value of gain is required. If the example formula provides a result of 5.5 dB gain, then the result is greater than the threshold amount of gain needed to allow mobile devices 210 associated with small cell 240 and also mobile devices 210 associated with macro base station 230 to receive service.

If the capacity gain value does not meet the threshold value of gain (e.g., the capacity gain does not provide enough gain to provide service to all mobile devices 220 in macro cell 220), then macro base station 230 may determine (e.g., using the example formula) a second value for the capacity gain by increasing (or decreasing) the number of small cells 240, increasing or decreasing the cell range extension value, and/or increasing or decreasing the almost blank subframe ratio. Macro base station 230 may adjust combinations of the available variables (e.g., increase the number of small cells 240 and then increase the cell range extension value; increase the almost blank subframe ratio and increase the number of small cells 240, etc.) and macro base station 230 may run multiple calculations (changing the values of one or more of the variables in the example formula described in block 520) based on different combinations until the maximum capacity gain value is equal to, or greater than, the threshold value of gain. Macro base station 230 may determine the combination of factors based on information stored by macro base station 230 and/or instructions from another device (e.g., management device 260).

Alternatively, the maximum capacity gain value may be greater than a defined maximum threshold value of gain. Macro base station 230 may store information that the maximum capacity gain value cannot be, for example, 10%, 20%, 30% or some other value, greater than the threshold value. For example, if the maximum capacity gain value is 10 dB, the maximum threshold value of gain is 5 dB and the capacity gain value cannot be 20% greater than the maximum threshold value of gain, then macro base station 230 may determine another maximum capacity gain value that is equal to, or greater than, the threshold value but not 20% greater than the threshold value.

Macro base station 230 may store instructions that may change variables on an incremental basis (e.g., if maximum gain is not sufficient, increase the cell range extension value by a particular percentage, such as 5%, 10%, 20% etc., or increase the number of small cells 240 by a particular number, such as 1, 2, 5, etc., or a particular percentage, such as 10%, 20%, 5%, etc.) and/or instructions that may change all the values of the variables based on relationships between the different variables (e.g., increase cell range extension value by 10% and increase the number of small cells 240 by 10%), and/or instructions that may change variables based upon the size of small cell 240. Macro base station 230 may also change the cell range extension values based on the size of the area associated with small cell 240 (e.g., if small cell 240 is less than 10,000 square feet, increase the cell range extension value by a particular percentage, such as 1%, 3%, 5%, etc., or if small cell 240 is associated with a particular type of location, such as a school, increase the cell range extension value by a particular percentage, such as 4%, during a particular time of the day) If a small cell 240 is associated with a particular type of area (e.g. a coffee shop, shopping mall, school, etc.), then based on stored information regarding dB values associated with geographic areas that are similar in size to the particular type of location, macro base station 230 may use the stored dB value information for the cell range extension variable in the formula (e.g., if small cell 240 is associated with a coffee shop that is 5,000 square feet and is open Monday to Saturday from 9:00 a.m. to 8:00 p.m., then macro base station 230 (or another device in the network) may have stored information that coffee shops with these particular hours which are 5,000 square feet may require a cell range extension value of 4 dB.

Once macro base station 230 has determined that the maximum capacity gain value (at a minimum) meets the threshold value of gain (based on an almost blank subframe value, cell range extension value, and/or the number of small cells 240), macro base station 230 may implement the changes in macro cell 220. For example, macro base station 230 may send an instruction to a wireless access point in a small cell 240 that the wireless access point is to increase its cell range extension value from 5 dB to 8 dB. Additionally, or alternatively, macro base station 230 may increase or decrease the amount of almost blank subframes that macro base station 230 transmits to macro cell 220 based on the result of the example formula described above. If an additional small cell 240 is needed, macro base station 230 may activate an inactive wireless access point or physically add a small cell 240 (e.g., adding a new wireless access point). Macro base station 230 may communicate to another network device (e.g., management device 260) that may send a request for one or more individuals (e.g., a email or text message to a field engineer or technician) to activate the inactive wireless access point (e.g., powering on the inactive wireless access point and/or physically reconnecting the wireless access point to the network) or physically add a small cell 240.

Alternatively, macro base station 230 may send a message to management device 260 that additional or fewer small cells 240 are required once macro base station 230 has made that determination using, for example, the example formula described above. Management device 260 may receive the message from macro base station 230 and may send a notification (e.g., to another network device) to deploy an additional small cell 240 or to reduce the number of small cells 240.

Process 500 may include sending information to the small cell (block 530). For example, macro base station 230 may send information to small cell 240 within carrier network 220. Macro base station 230 may send a message to small cell 240 to instruct a wireless access device in small cell 240 to increase, or decrease, the cell range extension area based on the capacity gain result in block 520. Small cell 240 may receive the instruction from macro base station 230 and may increase or decrease the amount of dB to change the cell range extension area. For example, small cell 240 may receive an instruction on the amount of dB (e.g., increase dB to 5 dB, 6 dB, 10 dB, etc.). If macro base station 230 sends an instruction to small cell 240 to increase or decrease the dB range beyond a dB capacity range for small cell 240, then small cell 240 may send a message to macro base station that the requested dB amount is not available.

Figure 6:
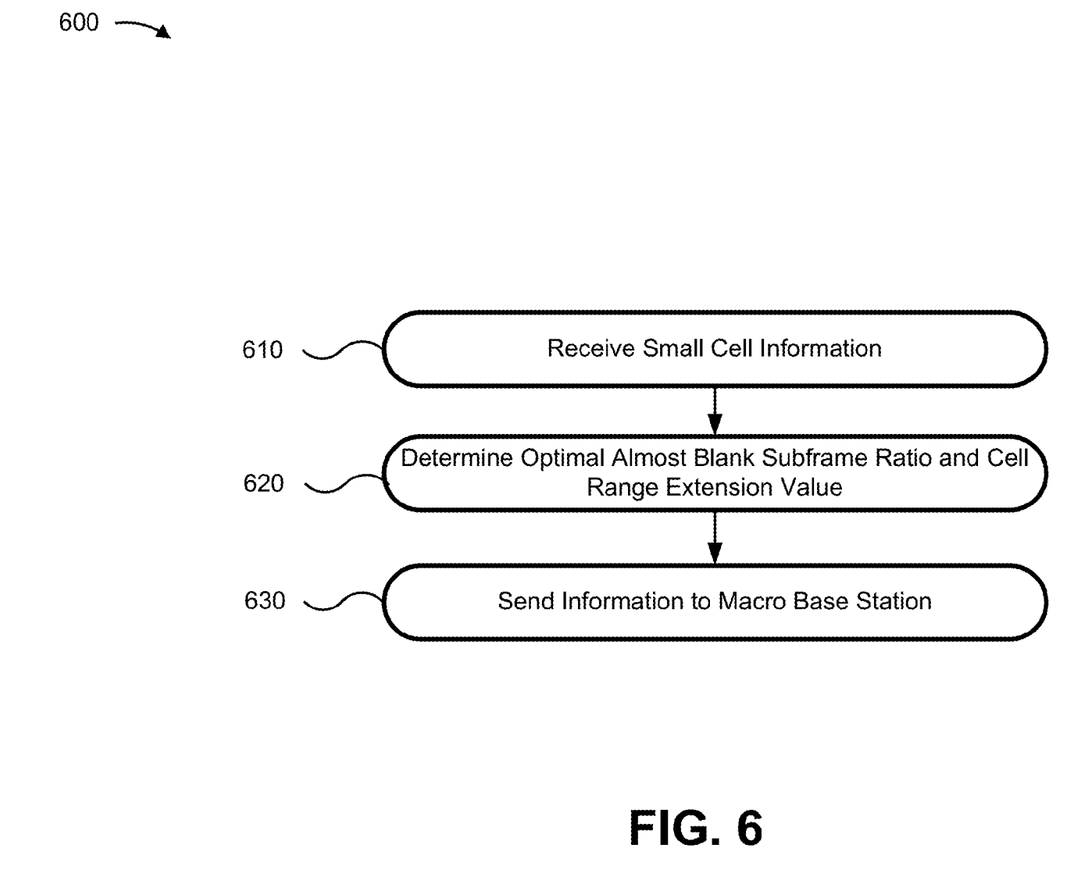
FIG. 6 is a flowchart of an example process for determining the optimal almost blank subframe ratio and/or cell range extension value.

FIG. 6 is a flow chart illustrating an example process 600 for determining an optimal almost blank frame ratio and/or a cell range extension value. Process 600 may be performed, for example, by management device 260. In other implementations, some or all of process 600 may be performed by another device or group of devices, such as macro base station 230 and/or mobile device 210.

Process 600 may include receiving small cell information (block 610). For example, management device 260 may receive information from small cell 240 and/or macro base station 230. Management device 260 may receive information that includes radio frequency characteristics associated with small cells 240. For example, management device 260 may receive information (or have information stored) about backhaul services, such as Ethernet, fiber, or other types of services that are associated one or more small cells 240. Management device 260 may use the information to determine whether an existing cell range extension area for small cell 240 should be increased or decreased, or whether a new cell range extension area for small cell 240 should be created.

Management device 260 may store information regarding the geographic size and/or location information from macro base station 230 and/or small cell 240 indicating small cell 240 is located in a particular location. For example, management device 260 may have information that small cell 240 is associated with a book store and a geographic size of 2,000 square feet or that small cell 240 is associated with a shopping mall and a geographic size of 300,000 square feet. Management device 260 may use this information to determine cell range extension values to cover the boundary of the area associated with small cell 240 in a manner similar to that described with regard to block 510 in FIG. 5. For example, a book store may have a smaller area and thus a smaller cell range extension value (e.g., management device 260 may determine that a book store which is 5,000 square feet requires a cell range extension value of 3 dB based on the book store size) than a shopping mall area that may require a larger cell range extension value (e.g., management device 260 may determine that a shopping mall is 500,000 square feet and requires a cell range extension value of 15 dB based on the shopping mall size).

Management device 260 may also store additional information associated with the type of area being served within small cell 240. For example, management device 260 may store information that small cell 240 is being used in a flower shop and that the flower shop is open at particular hours of the day, and/or the number of users historically present during various time periods, information that is provided by the user (e.g., through a user device local to small cell 240). This information may be used by management device 260 to calculate cell range extension values (e.g., a cell range extension value of 2 dB is needed from 1:00 p.m. to 5:00 p.m. at the flower shop due to the increased number of user devices).

Additionally, management device 260 may receive information from small cell 240 regarding the number of mobile devices 210 receiving service from small cell 240. Additionally, management device 260 may receive information, from small cell 240, regarding the current data usage associated with the number of mobile devices 210. Additionally, management device 260 may receive information, from small cell 240, regarding the amount of dB for the cell range extension area associated with small cell 240.

Process 600 may include determining the optimal almost blank subframe ratio and cell range extension value (block 620). Management device 260 may run simulations using different numbers of small cells 240 to determine the appropriate number of small cells 240 to provide sufficient capacity for macro cell 220 without reducing the ability of macro base station 230 to provide service. This may include running simulations with different quantities of almost blank subframes and/or cell range extension values. In one example implementation, management device 260 may use the example formula, described with regard to block 520 in FIG. 5, to determine the maximum capacity gain based on implementing the appropriate number of small cells 240 in macro cell 220. In another example implementation, management device 260 may use other simulation systems and/or methods to determine the appropriate number of small cells 240, the amount of almost blank subframes, and/or the cell range extension values to provide the maximum capacity gain for macro cell 220.

In either of the above example implementations, management device 260 may use the result of the simulation to determine whether the maximum capacity gain meets a threshold value of gain based on the number of small cells 240, the almost blank subframe ratio, and/or the cell range extension value. Management device 260 may compare the maximum capacity gain from the example formula with a threshold value of gain (stored by management device 260) needed to provide service to all the mobile devices 210 in macro cell 220. Additionally, management device 260 may determine that almost blank subframes from one or more macro base stations 230 in macro cell 220 are transmitted at the same time (e.g., the transmissions are synchronous).

If the maximum capacity gain does not meet the threshold value of gain, management device 260 may run additional simulations (e.g., using the example formula described with regard to block 520 in FIG. 5) until a maximum capacity gain value meets the threshold value of gain needed to provide service to all the mobile devices 210 in macro cell 220.

Alternatively, the maximum capacity gain value may be greater than a defined maximum threshold value of gain. Management device 260 may store information that the maximum capacity gain value cannot be, for example, 10%, 20%, 30% or some other value, greater than the threshold value of gain. For example, if the maximum capacity gain value is 10 dB, the maximum threshold value of gain is 5 dB, and the capacity gain value cannot be 20% greater than the maximum threshold value of gain, then management device 260 may determine another maximum capacity gain value that is equal to or greater than the threshold value but not 20% greater than the threshold value.

Management device 260 may increase, or decrease, the variables in the example formula (described with regard to block 520 in FIG. 5) to reach the threshold value of gain.

Management device 260 may, for example, incrementally change the value of a variable (e.g., increase the cell range extension value by 0.5 dB for each simulation). Additionally, or alternatively, management device 260 may, for example, increase the values of multiple variables by the same increment (e.g., increase the cell range extension value and the almost blank subframe ratio by 5% for each simulation). Management device 260 may also use cell range extension values based on the size of the area associated with a small cell 240. For example, if a small cell 240 is associated with a shopping mall, then management device 260 may use values (e.g., 15 dB) for the cell range extension value based on stored information regarding historical dB values associated with geographic service areas similar to a shopping mall.

Process 600 may include sending information to the macro base station (block 630). For example, management device 260 may send information to macro base station 230. The information may include what values macro base station 230 may assign for the almost blank subframes ratio and the cell range extension area for each small cell 240 in the macro cell 220 based on the results of the simulation described in block 620. Macro base station 230 may receive the information and may instruct each small cell 240 within the macro cell 220. For example, macro base station 230 may send a message to small cell 240 so that small cell 240 may increase, or decrease, the cell range extension area based on the result in block 620.

Figure 7A:
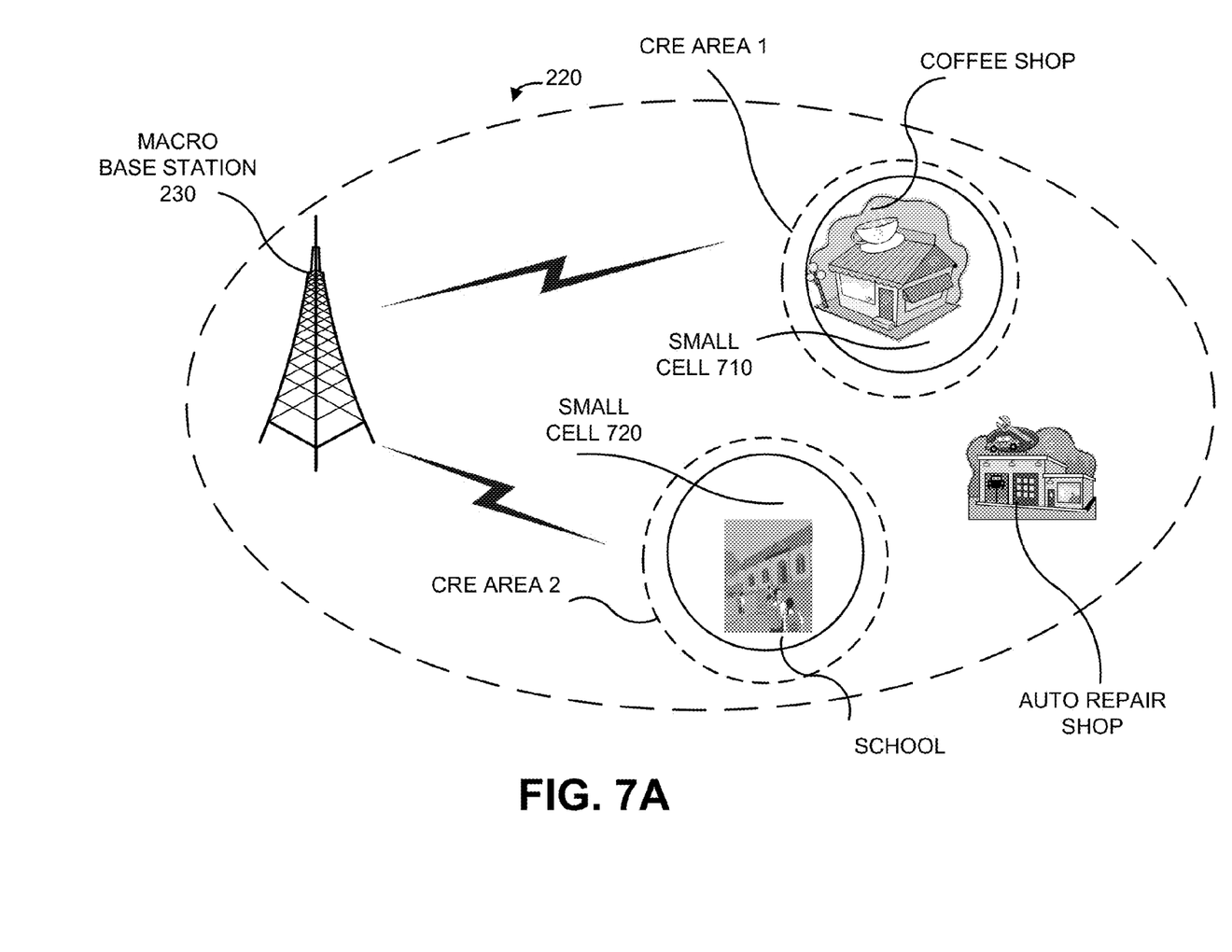
FIGS. 7A-7B are diagrams of example processes for determining the number of small cells.
Figure 7B:
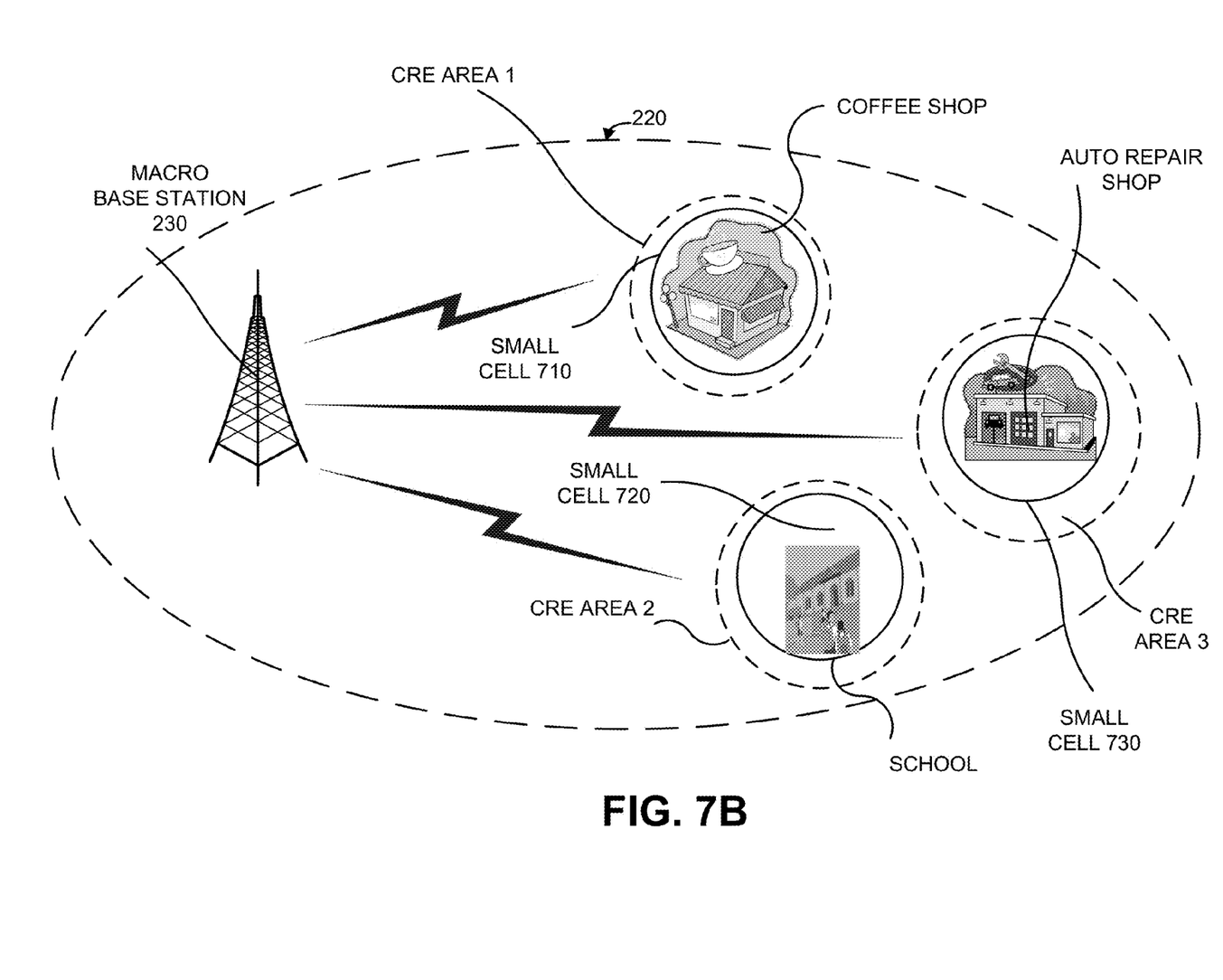

FIGS. 7A-7B are diagrams of example processes for determining the number of small cells. FIG. 7A shows user device 210, carrier network 220, macro base station 230, small cell 710, small cell 720, cell range extension area 1 (CRE area 1), and cell range extension area 2 (CRE area 2). Small cell 710 and small cell 720 may each correspond to small cell 240 described with regard to FIG. 2. FIG. 7B shows the devices and networks described in FIG. 7A and also includes cell range extension area 3 (CRE area 3) and small cell 730. Small cell 730 may correspond to small cell 240 described with regard to FIG. 2.

As shown in FIG. 7A, macro base station 230 may be communicating with small cell 710 and small cell 720 to obtain information to determine the optimal almost blank subframe ratio and cell range extension area for each small cell so that there is enough capacity for providing service within macro cell 220. As shown in FIG. 7A, small cell 710 is associated with a coffee shop and small cell 720 is associated with a school.

Macro base station 230 may receive information from small cell 710 that includes a number of users (8 users), and average data usage information per user in the coffee shop. Macro base station 230 may receive an identifier from small cell 710 that small cell 710 is associated with a hot spot area within macro cell 220. Additionally, macro base station 230 may receive information from small cell 720 that includes a number of users (25 users) and average data usage information per user in the school. Further, macro base station 230 may receive an identifier from small cell 720 that small cell 720 is associated with an area that has a uniform distribution of users.

Macro base station 230 may use the information from small cell 710 and small cell 720 and also input a value for almost blank subframe ratio for each small cell and a value for the cell range extension (based on the number of users within each small cell). Macro base station 230 may use an almost blank subframe ratio of 0.30 for small cell 710 and small cell 720. Macro base station 230 may use a cell range extension value of 12 dB for small cell 710 and a cell range extension value of 20 dB for small cell 720.

Macro base station 230 may determine (e.g., using the formula described with regard to block 520 in FIG. 5) that the gain does not meet the capacity requirements of macro cell 220. Macro base station 230 may adjust the almost blank subframe ratio and the cell range extension value for small cell 710 and small cell 720 until there is enough gain to meet the capacity requirements of macro cell 220. Further, macro base station 230 may determine that an additional small cell is needed to provide the amount of capacity gain to provide service to all the user devices 210 within the coverage area (or at least a threshold number of user devices 210) serviced by macro base station 230.

As shown in FIG. 7B, small cell 730 is deployed at an auto repair shop. Assume that macro base station 230 sent a message to a network management device (e.g., network management device 260) to request the deployment of small cell 730. Further, assume that macro base station 230 may determine that there is enough gain with an almost blank subframe ratio of 0.37 for small cell 710, small cell 720, and small cell 730; a cell range extension value of 15 dB for small cell 710, and a cell range extension value of 25 dB for small cell 720. Further, assume that macro base station 230 may determine a cell range extension value of 11 dB for small cell 730.

Thus, assume that macro base station 230 may transmit with 37% of frames as almost blank subframes to small cell 710, small cell 720; and small cell 730. Assume that macro base station 230 may transmit a message to small cell 710 that small cell 710 should have a cell range extension area associated with 15 dB; transmit a message to small cell 720 that small cell 720 should have a cell range extension area associated with 25 dB; and transmit a message to small cell 730 that small cell 730 should have a cell range extension area associated with 11 dB.

Systems and/or methods, described herein, may allow a carrier (e.g., a mobile network operator, a wireless service provider, a cellular company, etc.) to deploy one or more small cells (e.g., a micro cell, a pico cell, a femto cell, or the like) in a cellular network by optimizing an almost blank subframe ratio and/or a cell range extension value so that the interaction between the small cells and a macro base station does not reduce the capacity of the macro base station. As a result, this may allow the carrier to optimize network performance with greater accuracy rather than using an ad-hoc approach to using small cells in conjunction with macro base stations.

The foregoing disclosure provides illustration and description, but is not intended to be exhaustive or to limit the embodiments to the precise form disclosed. Modifications and variations are possible in light of the above disclosure or may be acquired from practice of the embodiments.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A network device configured to:
   receive information from a plurality of wireless access points, the information relating to a plurality of mobile devices associated with the plurality of wireless access points, data usage of the plurality of mobile devices, and a cell range extension area associated with one or more of the plurality wireless access points;
   analyze the information;
   determine, based on analyzing the information and a quantity of almost blank subframes associated with each of the plurality of wireless access points, a capacity gain associated with using the plurality of wireless access points within an area associated with the network device;
   determine whether the capacity gain provides at least a threshold amount of gain, the threshold amount of gain permitting the network device and the plurality of wireless access points to provide service to the plurality of mobile devices within the area; and
   based on determining whether the capacity gain provides the at least a threshold amount of gain, at least one of:
   adjust the quantity of almost blank subframes, or
   send an instruction to perform an action to change at least one of the cell range extension area or a quantity of the plurality of wireless access points.

2. The network device of claim 1, where,
   when receiving information from the plurality of devices, the network device is further configured to receive information from one of the plurality of wireless access points that the one of the plurality of wireless access points is located in a particular type of geographic area; and
   when determining whether the capacity gain provides the at least a threshold amount of gain, the network device is further configured to determine whether a cell range extension value, associated with a cell range extension area, provides the at least a threshold amount of gain.

3. The network device of claim 1, where, when determining whether the capacity gain provides the at least a threshold amount of gain, the network device is further configured to:
   determine that the capacity gain does not provide the at least a threshold amount of gain to permit the network device and the plurality of wireless access points to provide service to the plurality of mobile devices in the area; and
   in response to determining that the capacity gain does not provide the at least a threshold amount of gain:
      determine a second capacity gain by increasing the cell range extension area for one of the plurality of wireless access points;
      determine that the second capacity gain provides the at least a threshold amount of gain permitting the network device and the plurality of wireless access points to provide service to the plurality of mobile devices in the area; and
      send information to the one of the plurality of wireless access points increase the cell range extension area.

4. The network device of claim 1, where, when analyzing the information, the network device is further configured to:
   analyze a relationship between a cell range extension value, an almost blank subframe value, and the number of plurality of wireless access points.

5. The network device of claim 1, where, when receiving the information from the plurality of wireless access points, the network device is further configured to:
   receive information on a particular amount of the plurality of mobile devices that are served by the plurality of wireless access point.

6. The network device of claim 1, where, when determining whether the capacity gain provides the at least a threshold amount of gain, the network device is further configured to:
   determine whether the capacity gain provides the at least a threshold amount of gain to permit one of the plurality of wireless access points to provide service to one or more of the plurality of mobile devices located in an area associated with one of the plurality of wireless access points.

7. The network device of claim 1, where, when receiving information from the plurality of wireless access devices, the network device is further configured to:
   receive decibel information associated with the cell range extension area for one of the plurality of wireless access devices; and
   where, when determining whether the capacity gain provides the at least a threshold amount of gain, the network device is further configured to determine whether the decibel information associated with the cell range extension area provides the at least a threshold amount of gain.

8. The network device of claim 1, where, when determining whether the capacity gain, provides the threshold amount of gain, network device is to:
   determine the capacity gain using $C\{e_j, r\} = \max_{\{r, e_j\}} \{\Sigma_{j=0}^{(n-1)} u_j(e_j) \cdot D_j + (1-r) \cdot C_m\}$.

9. The network device of claim 1, where,
   when analyzing the information, the network device is configured to determine that the wireless access points are associated with different types of service areas; and when determining whether the capacity gain provides the threshold amount of gain, the network device is configured to:
  determine the capacity gain of each wireless access point based on types of service area covered by the wireless access point.

10. The network device of claim 1, where the quantity of almost blank subframes is selected to maximize the number of user devices services over the area based on coverage provided in areas by the plurality of wireless access points and coverage outside of the plurality of wireless access points.

11. A method comprising:
  receiving, by a network device, information from a plurality of wireless access points, the information relating to a plurality of mobile devices associated with each one of the plurality of wireless access points, data usage of the plurality of mobile devices, and a cell range extension area associated with each one of the plurality wireless access points;
  analyzing, by the network device, the information;
  determining, by the network device, whether a capacity gain provides at least a threshold amount of gain, the at least a threshold amount of gain permitting the network device and the plurality of wireless access points to provide service to the plurality of mobile devices within the area; and
  based on determining whether the capacity gain provides the at least threshold amount of gain, at least one of:
    adjusting the quantity of almost blank subframes, or
    sending an instruction to perform an action to change at least one of the cell range extension area or a quantity of the plurality of wireless access points.

12. The method of claim 11, where receiving the information from the plurality of wireless access points includes:
  receiving information from one of the plurality of wireless access points that the one of the plurality of wireless access points is located in an area with a particular geographic size; and
  where determining the capacity gain includes:
    determining the capacity gain using a cell range extension value that is associated with the particular geographic size.

13. The method of claim 11, where determining whether the capacity gain provides the at least a threshold amount of gain includes:
  determining that the capacity gain does not provide the at least a threshold amount of gain to permit the network device and the plurality of wireless access points to provide service to the plurality of mobile devices; and
  the method further comprising:
    determining a second capacity gain by adjusting the number of the plurality of wireless access points; and
    determining that the second capacity gain provides the at least a threshold amount of gain to permit the network device and the plurality of wireless access points to provide service to the plurality of mobile devices.

14. The method of claim 11, where determining whether the capacity gain provides the at least a threshold amount of gain includes:
  determining that the capacity gain does not provide the at least a threshold amount of gain to permit the network device and the plurality of wireless access points to provide service to the plurality of mobile devices; and
  the method further comprising:
    determining a second value for the capacity gain by adjusting the number of the plurality of wireless access points, and the quantity of almost blank subframes; and
    determining that the second capacity gain provides the at least a threshold amount of gain to permit the network device and the plurality of wireless access points to provide service to the plurality of mobile devices.

15. The method of claim 11, where determining whether the capacity gain provides the at least a threshold amount of gain includes:
  determining that the capacity gain provides the at least a threshold amount of gain to permit the network device and the plurality of wireless access points to provide service to the plurality of mobile devices.

16. The method of claim 11, where the cell range extension area is associated with a decibel value.

17. The method of claim 11, where each of the wireless access points is associated with a different cell range extension value.

18. The method of claim 11, where the network device is transmitting a first quantity of almost blank subframes that are different than a second quantity of almost blank subframes that are being transmitted by a second network device.

19. The method of claim 11, where the network device is transmitting almost blank subframes in a first macro cell at the same time as another network device is transmitting different almost blank subframes in a second macro cell.

20. A non-transitory computer-readable medium comprising:
  a plurality of instructions, that when executed by one or more processors of a network device, cause the one or more processors to:
    receive information from a plurality of access points, the information relating to a plurality of mobile devices associated with the plurality of access points, data usage of the plurality of mobile devices, and a cell range extension area associated with one or more of the plurality access points;
    analyze the information;
    determine whether a capacity gain provides at least a threshold amount of gain, the at least a threshold amount of gain permitting the network device and the plurality of wireless access points to provide service to the plurality of mobile devices within the area; and
    based on determining whether the capacity gain provides the at east a threshold amount of gain, at least one of:
      adjust the quantity of almost blank subframes, or
      send an instruction to perform an action to change at least one of the cell range extension area or a quantity of the plurality of wireless access points.

21. The non-transitory computer-readable medium of claim 20, where one or more instructions, of the plurality of instructions, to receive the information from the plurality of access points include one or more instructions to:
  receive decibel information associated with each of the cell range extension areas dated with each of the plurality of access points,
  the decibel information being different for each of the cell range extension areas associated with each of the plurality of access points.

22. The non-transitory computer-readable medium of claim 20, where one or more instructions, of the plurality of instructions, to determine whether the capacity gain provides the at least a threshold amount of gain include one or more instructions to:
- determine that the capacity gain does not provide the at least a threshold amount of gain; and
- the computer-readable medium further comprising one instructions, that when executed by the one or more processors, cause the one or more processors to:
  - determine a second capacity gain value by adjusting the cell range extension area and the number of the plurality of access points;
  - determine that the second capacity gain value provides the at least a threshold amount of gain to permit the network device and the plurality of access points to provide service to the plurality of mobile devices; and
  - send information to the one or more of the plurality of access points to adjust the cell range extension area associated with the one or more of the plurality of access points.

23. The non-transitory computer-readable medium of claim 20, where one or more instructions, of the plurality of instructions, to analyze the information include one or more instructions to:
- analyze a relationship between a cell range extension value, an almost blank subframe value, and the number of the plurality of access points.

24. A system comprising:
- a plurality of wireless access points each configured to send information relating to mobile devices associated with the wireless access point, data usage of the mobile devices, and a cell range extension area associated with the wireless access point; and
- a plurality of network devices, configured in cooperation to:
  - determine, based on analyzing the information and a quantity of almost blank subframes associated with each of the plurality of wireless access points, a capacity gain associated with using the plurality of wireless access points within an area associated with the network device;
  - determine whether the capacity gain provides at least a threshold amount of gain, the threshold amount of gain permitting the network device and the plurality of wireless access points to provide service to the plurality of mobile devices within the area; and
  - based on determining whether the capacity gain provides the at least a threshold amount of gain, at least one of:
    - adjust the quantity of almost blank subframes, or
    - send an instruction to perform an action to change at least one of the cell range extension area or a quantity of the plurality of wireless access points.

* * * * *